No. 718,157. PATENTED JAN. 13, 1903.
G. C. RIBER.
PIPE FLANGE OR COUPLING.
APPLICATION FILED AUG. 27, 1902.
NO MODEL.
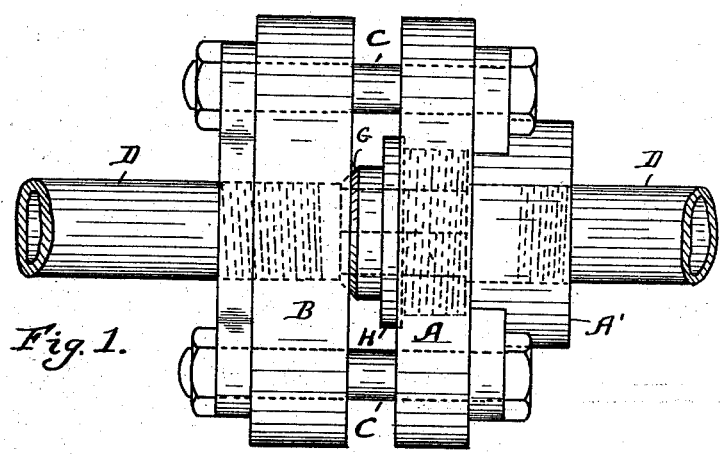
Fig. 1.
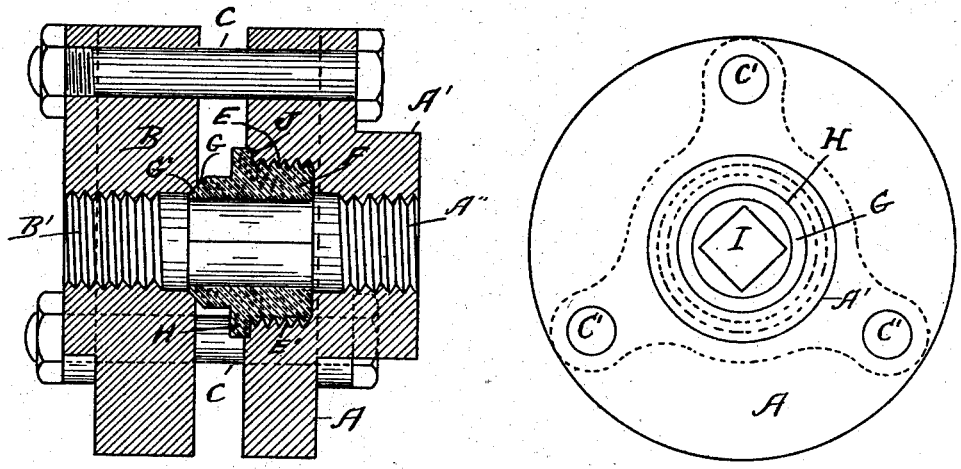
Fig. 3.    Fig. 2.
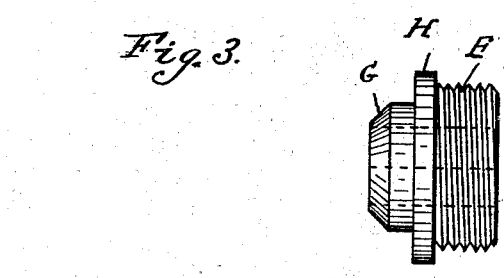 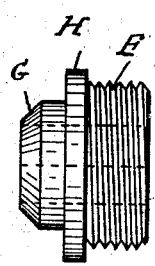
Fig. 4.
WITNESSES
Carolyn M. Theobald.
Matthew Siebler
Geo. C. Riber
INVENTOR
By R. J. McCarty,
his ATTORNEY

UNITED STATES PATENT OFFICE.

GEORGE C. RIBER, OF DAYTON, OHIO.

PIPE FLANGE OR COUPLING.

SPECIFICATION forming part of Letters Patent No. 718,157, dated January 13, 1903.

Application filed August 27, 1902. Serial No. 121,189. (No model.)

*To all whom it may concern:*

Be it known that I, GEORGE C. RIBER, a citizen of the United States, residing at Dayton, in the county of Montgomery and State of Ohio, have invented certain new and useful Improvements in Pipe Flanges or Couplings; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in pipe flanges or couplings.

The object of the invention is to provide a pipe joint or coupling that obviates the necessity of employing the usual gaskets or packing-glands.

Preceding a detail description of the invention reference is made to the accompanying drawings, of which—

Figure 1 is an elevation of my improved pipe flange or coupling, showing the same connecting or joining the ends of two pipe-sections. Fig. 2 is an elevation of the inner side of one of the flanges. Fig. 3 is a sectional view of the two flanges connected. Fig. 4 is a detached view of the screw-plug.

In a detail description of the invention similar reference characters indicate corresponding parts.

The coupling consists of two sections or annular flanges A and B, the former of which has a hub or boss A'. These flanges are provided with a suitable number of bolt-holes C' for bolts C, by means of which the two sections or flanges are rigidly united. The flanges A and B are each provided with screw-threaded openings in their centers, as indicated by B' and A'', for the attachment of the ends of pipe-sections D D. On the inner face of flange B the opening in the center of said flange terminates in a concave surface G', providing a suitable seat for the tapered end G of a plug F. The said plug F has an opening I through its center, which forms a continuous communication between the two pipe-sections D D when the latter are united to the coupling. This plug F has a portion of its body provided with exterior screw-threads E, which screw into an opening E' in the flange A. The opening E' is of greater diameter than the opening A''. H designates a flange on the screw-plug F, which fits into an annular recess J in the flange A when said screw-plug is screwed into the flange, as shown in Figs. 1 and 3. The flange H and recess J keep the plug in proper position and prevent any side movement thereof. This always insures a proper contact of the tapered surfaces G and G'. This screw-plug F is essentially of softer metal than the flanges A and B in order that a proper contact may be made between the tapered end G and the tapered seat G'. By making said screw-plug detachable it may be removed from the flange A whenever excessive usage makes such necessary and a new plug inserted.

In practice it will be seen that the tapered surfaces G and G' may be brought in rigid contact by tightening the bolts C, and thereby the employment of a gasket or packing-ring is entirely dispensed with, as the connection may be such as to preclude the possibility of any leakage at the joint. The coupling has been found to possess great advantages not only as a means for coupling gas and water pipes, but in the case of steam-pipes, where the possibility of leakage is much greater. It is well known that packing-rings or gaskets are short-lived, owing to the great pressure brought to bear upon them and the disintegrating effect of moisture.

Having described my invention, I claim—

In a pipe coupling or flange, two disks or flanges having screw-threaded openings in their centers for the attachment of two sections of pipe, the opening in one of said flanges terminating in a tapering seat on the inner face of said flange, the other flange having a screw-threaded opening in its inner face of larger diameter than the pipe-opening, the said larger opening being surrounded by an annular seat, a hollow screw-plug secured within the opening of larger diameter, the said screw-plug having a projecting end with a tapering surface which seats against the tapering seat in the opposite flange, a flange surrounding said screw-plug and occupying the space within the seat which surrounds the screw-threaded opening in the flange of larger diameter, and a series of bolts whereby the two flanges are tightened, substantially as set forth.

In testimony whereof I affix my signature in presence of two witnesses.

GEORGE C. RIBER.

Witnesses:
R. J. McCarty,
F. W. Howell.